US007428882B2

(12) United States Patent
Keil

(10) Patent No.: US 7,428,882 B2
(45) Date of Patent: Sep. 30, 2008

(54) HEIGHT ADJUSTABLE WET TABLE

(75) Inventor: Charles C. Keil, Fort Collins, CO (US)

(73) Assignee: Midmark Corporation, Versailles, OH (US)

( * ) Notice: Subject to any disclaimer, the term of this patent is extended or adjusted under 35 U.S.C. 154(b) by 0 days.

(21) Appl. No.: 11/431,744

(22) Filed: May 10, 2006

(65) Prior Publication Data

US 2006/0201448 A1 Sep. 14, 2006

Related U.S. Application Data

(63) Continuation of application No. 10/760,774, filed on Jan. 20, 2004, now Pat. No. 7,073,464.

(51) Int. Cl.
*A01K 13/00* (2006.01)
*A47K 1/05* (2006.01)

(52) U.S. Cl. ............................ 119/753; 119/674; 4/645

(58) Field of Classification Search ................. 119/753, 119/754, 755, 756, 656, 757, 674, 651, 601, 119/602; 5/604, 606; 108/24; 4/665, 645
See application file for complete search history.

(56) References Cited

U.S. PATENT DOCUMENTS

| | | | | |
|---|---|---|---|---|
| 1,900,255 | A * | 3/1933 | Ormsbee | 5/606 |
| 2,460,857 | A * | 2/1949 | Sweat | 119/757 |
| 3,473,173 | A * | 10/1969 | Schrock, Sr. et al. | 4/626 |
| 3,486,175 | A * | 12/1969 | Schwartz | 4/645 |
| 3,633,901 | A | 1/1972 | Lindquist | |
| 4,029,094 | A | 6/1977 | Winicki | |
| 4,073,240 | A | 2/1978 | Fly | |
| 4,454,628 | A * | 6/1984 | Olson | 452/194 |
| 4,544,214 | A * | 10/1985 | Nizel et al. | 312/209 |
| 4,836,144 | A | 6/1989 | Cole | |
| 5,050,253 | A * | 9/1991 | Wasek | 4/645 |
| 5,230,109 | A * | 7/1993 | Zaccai et al. | 4/645 |
| 5,244,433 | A | 9/1993 | Utterback | |
| 5,269,030 | A * | 12/1993 | Pahno et al. | 5/604 |
| 5,305,481 | A * | 4/1994 | Nebb | 4/516 |
| 5,443,017 | A * | 8/1995 | Wacker et al. | 108/3 |
| 5,526,823 | A | 6/1996 | Wheeler et al. | |
| 5,662,069 | A * | 9/1997 | Smith | 119/665 |
| 5,794,570 | A * | 8/1998 | Foster et al. | 119/756 |
| 5,826,286 | A | 10/1998 | Cranston | |
| 5,867,847 | A * | 2/1999 | Klawitter et al. | 4/645 |
| 5,927,745 | A | 7/1999 | Cunningham | |
| 6,089,242 | A | 7/2000 | Buck | |
| 6,101,956 | A | 8/2000 | Keil | |
| D439,670 | S | 3/2001 | Sommer | |
| 6,279,510 | B1 * | 8/2001 | Batterton | 119/753 |

(Continued)

OTHER PUBLICATIONS

U.S. Appl. No. 10/760,774, entitled "Veterinary Height Adjustable Wet Table", filed Jan. 20, 2004.

(Continued)

*Primary Examiner*—Yvonne R. Abbott
(74) *Attorney, Agent, or Firm*—Wood, Herron & Evans, LLP

(57) ABSTRACT

A height adjustable veterinary wet table can be lowered in elevation to assist in locating animals to the wet table surface and can be raised to an elevation desirable for veterinary treatment of the animal with material received by the wet sink transferred to a drainage system.

11 Claims, 10 Drawing Sheets

U.S. PATENT DOCUMENTS

Figure 1:
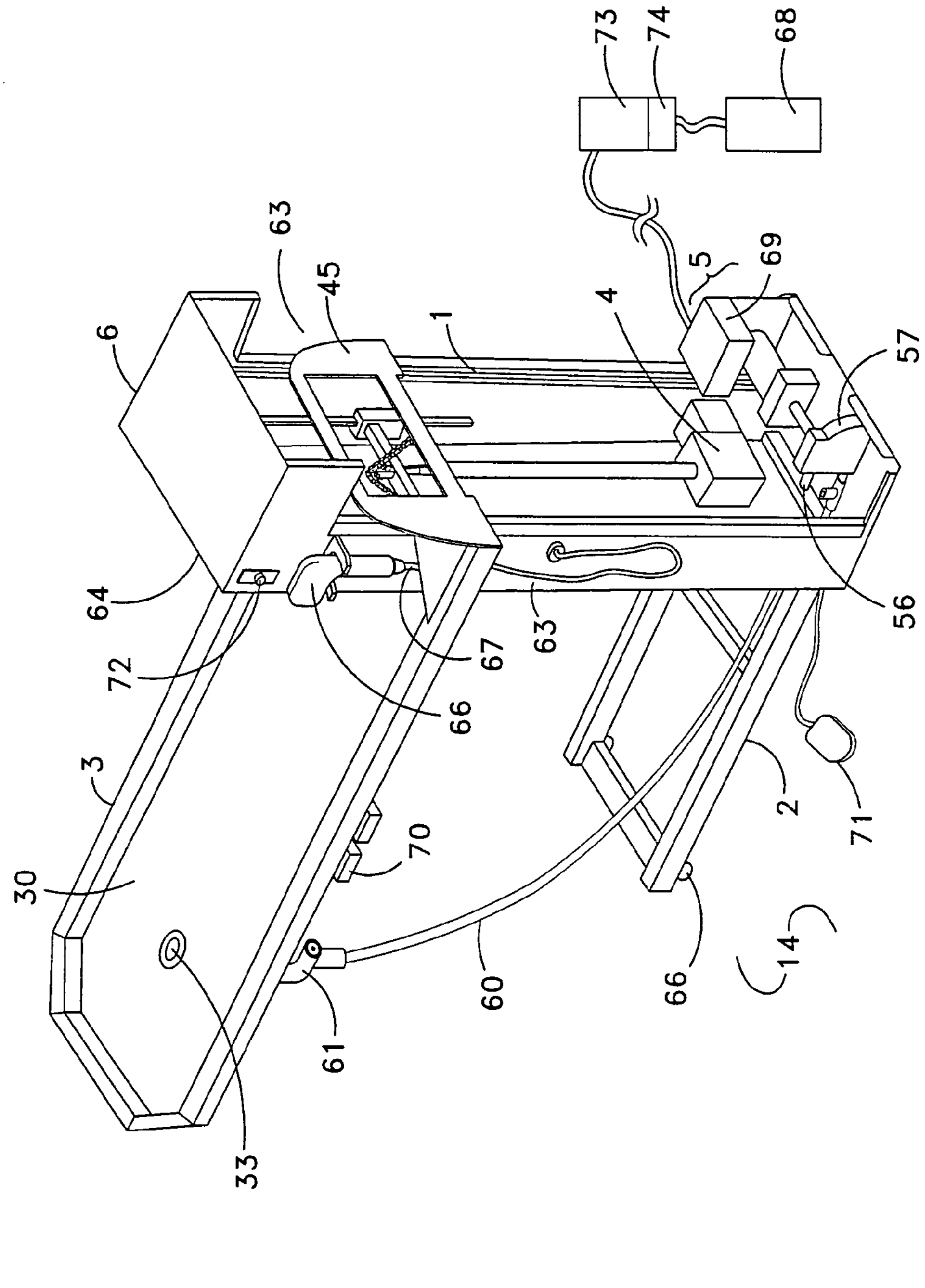

| | | | | |
|---|---|---|---|---|
| 6,435,110 | B1 | 8/2002 | Keil | |
| 6,467,112 | B1 | 10/2002 | Cheng | |
| 6,477,725 | B1 * | 11/2002 | Hong et al. | 4/645 |
| 6,553,943 | B1 * | 4/2003 | Murphy | 119/673 |
| 6,711,757 | B2 * | 3/2004 | Peck | 4/516 |
| 6,904,621 | B2 * | 6/2005 | Otto et al. | 4/144.1 |
| 2003/0024485 | A1 | 2/2003 | Freidell | |

OTHER PUBLICATIONS

"Introducing The No Clog T-Trap", web page of http://www.ttrap.com/, Jan. 16, 2004, one page.

Vetguide.com Illustrated Buyer's Guide to New Equipment and Supplies, Veterinary Economics, Details for: Wet lift table, web page of vetguide.ims.ca, Sep. 19, 2005, one page.

* cited by examiner

HEIGHT ADJUSTABLE WET TABLE

This U.S. patent application is a continuation of U.S. patent application Ser. No. 10/760,774, filed Jan. 20, 2004, hereby incorporated by reference herein.

A height adjustable veterinary wet table can be lowered in elevation to assist in locating animals to the wet table surface and can be raised to an elevation desirable for veterinary treatment of the animal with material received by the wet sink transferred to a drainage system.

I. BACKGROUND

The conventional veterinary table may be lowered to enable an animal to be transferred to the table surface and may be raised to a desired height to facilitate examination and treatment.

However, a significant problem with conventional height adjustable veterinary tables can be that during examination or treatment the animal may urinate or defecate on the table surface. This discharged material can be transferred to the animal and the veterinary personnel performing the examination or treatment and necessitate cleanup of the veterinary table and surrounding area thereafter.

Similarly, surgery, wound treatment, and other veterinary procedures may require irrigation or wash procedures or generate fluids which if not absorbed stream or pool on conventional veterinary table surfaces.

Additionally, animals are receiving an increasing level of dental care which requires brushing and rinsing of the animals mouth. Again, conventional veterinary tables may not equipped to dispose of waste liquids from these dental procedures.

Another significant problem with conventional veterinary tables may be that wet sinks are not height adjustable. As such, veterinary personnel transfer animals from the floor to the wet table surface so that medical procedures can be performed on the animal. Typically, two persons are required to lift a large animal to the surface of a conventional wet table. Even if one person was strong enough to relocate the animal without assistance, the job can be cumbersome and uncomfortable.

One impediment to providing a height adjustable wet table may be that drainage lines between the wet sink and the drainage system of the building are too rigid to allow height adjustment of the wet sink. Another impediment to providing a height adjustable wet table may be that as the height of a wet sink is lowered below the height of the drainage system inlet gravity prevents flow of liquids from the wet sink to the drainage system.

Another significant problem of conventional wet sinks may be that the wet sink is separate from the veterinary table and the animal must be positioned between the wet sink and the veterinary table. A related problem with conventional wet sinks may be that only a portion of the area of a veterinary table may provide a wet sink or the wet sink is too small to wash or treat the entirety of the animal over the wet sink without re-positioning the animal.

The instant veterinary table invention addresses each of the above-described problems.

II. SUMMARY OF THE INVENTION

A broad object of the invention can be to provide a height adjustable veterinary wet table which can be lowered to allow transfer of an animal onto the wet table surface and can be raised to a height convenient for treatment of the animal.

Another significant object of the invention is to provide a height adjustable wet table that transfers materials from the wet sink to the drain of a building regardless of the various flow paths generated between the wet sink and the receiving drain due to height adjustment of the wet sink. One aspect of this object of the invention can be to provide transfer of materials from the wet sink even when the receiving drain has a location higher in elevation. Another aspect of this object of the invention can be to provide transfer of materials from the wet sink even during height adjustment of the table.

Another significant object of the invention can be to provide a wet sink beneath the entirety of the table surface so that the entire animal can be treated with minimal re-positioning of the animal.

Another object of the invention can be to provide a self contained power unit to actuate the elevation assembly when there is no other source of power.

Naturally, further goals and objects of the invention are disclosed throughout other areas of the specification, drawings, photographs, and claims.

III. A BRIEF DESCRIPTION OF THE DRAWINGS

FIG. 1 provides an isometric view of an embodiment of the height adjustable veterinary table which provides a height adjustable wet sink.

Figure 2:
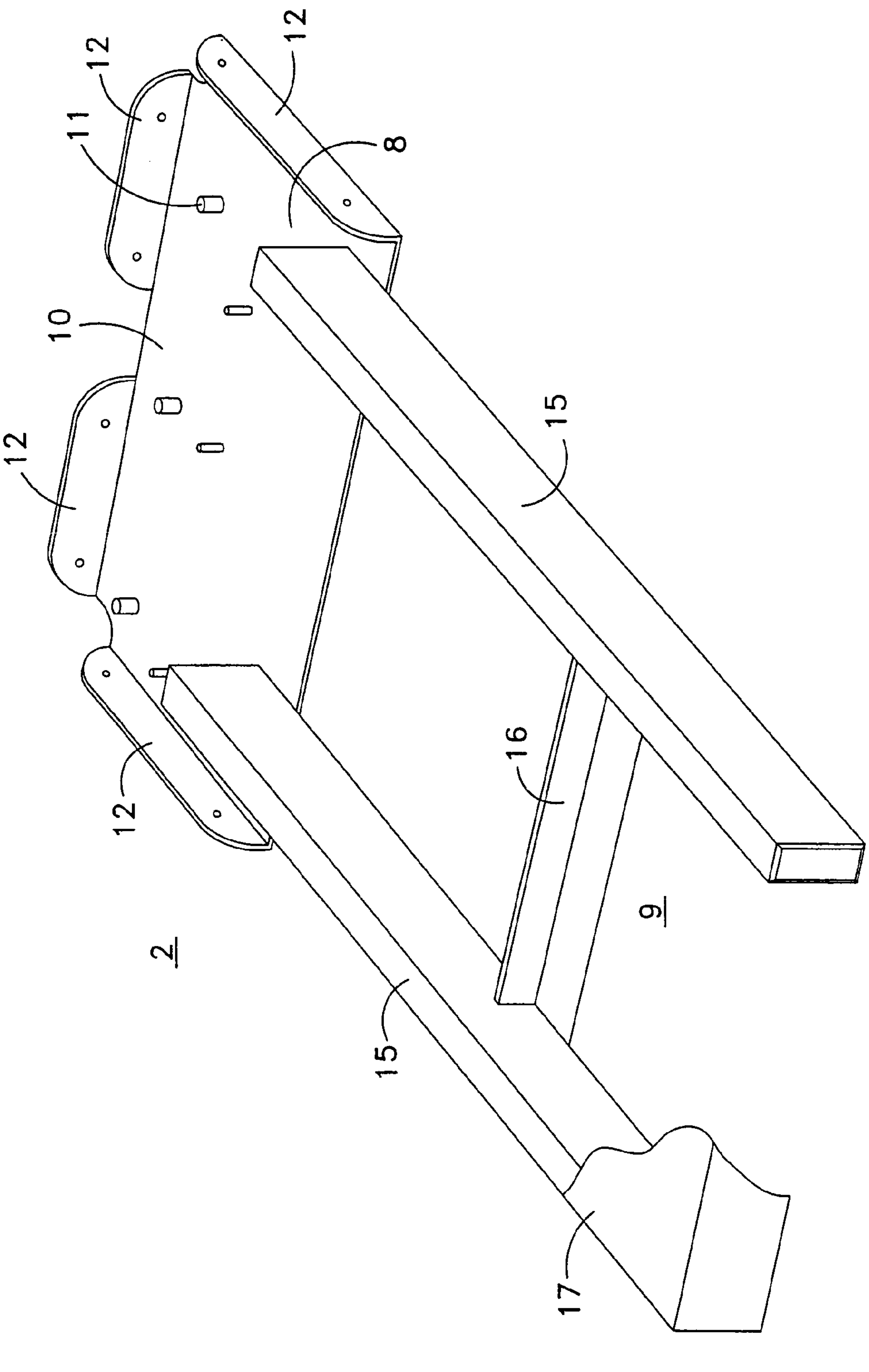

FIG. 2 provides an isometric view of an embodiment of the support assembly of the veterinary table.

Figure 3:
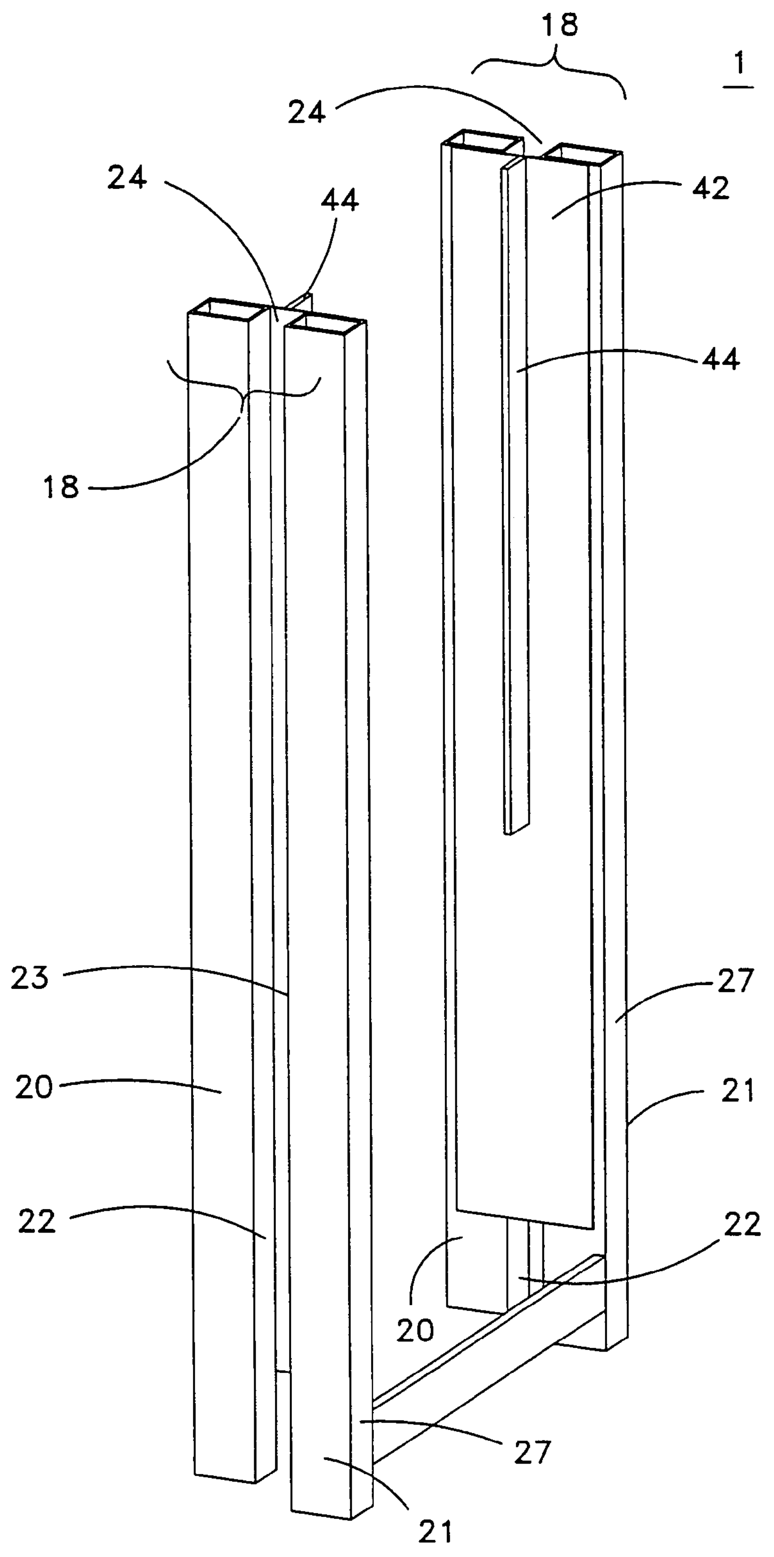

FIG. 3 provides an isometric view of an embodiment of the vertical frame assembly.

Figure 4:
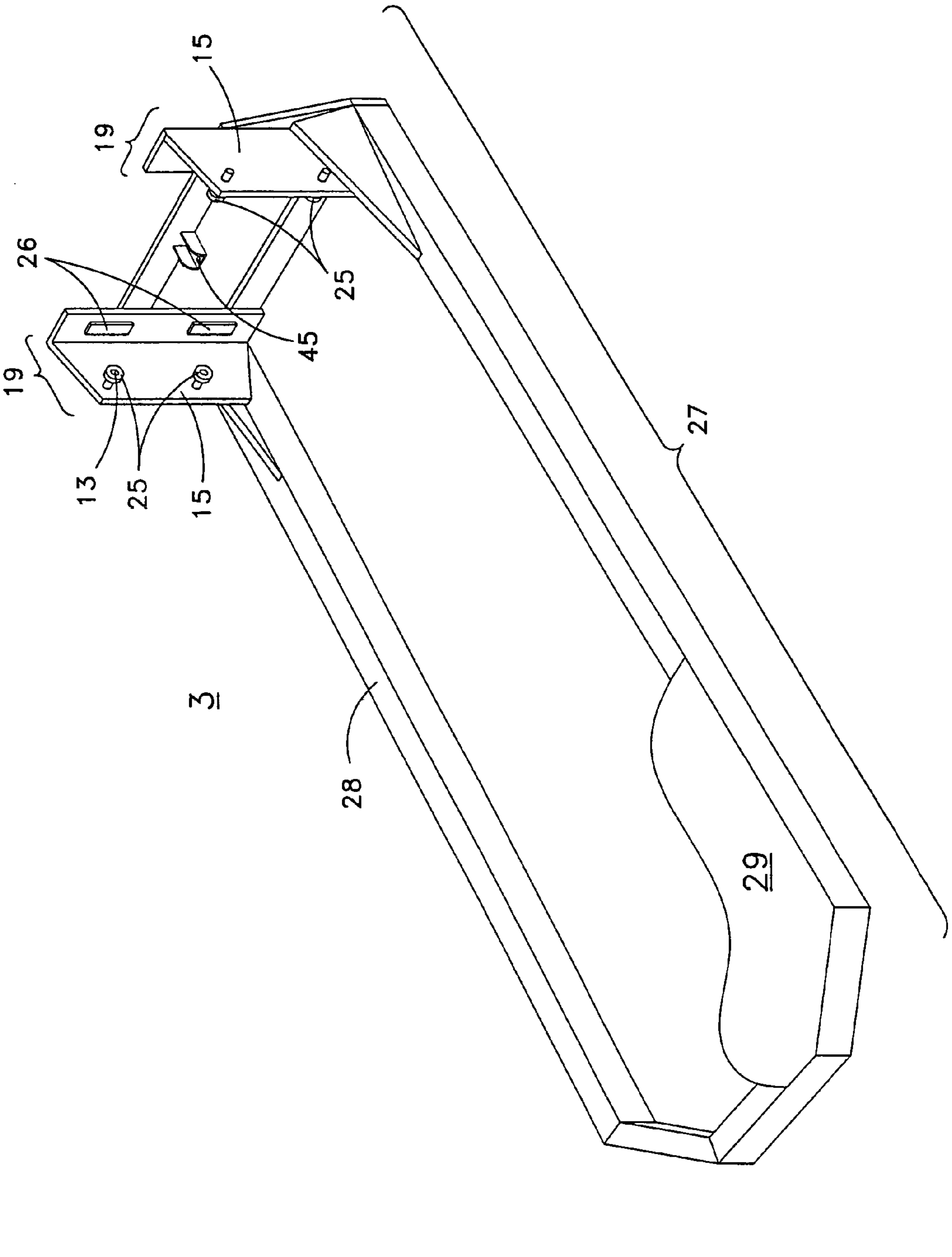

FIG. 4 provides an isometric view of an embodiment of the table assembly.

Figure 5:
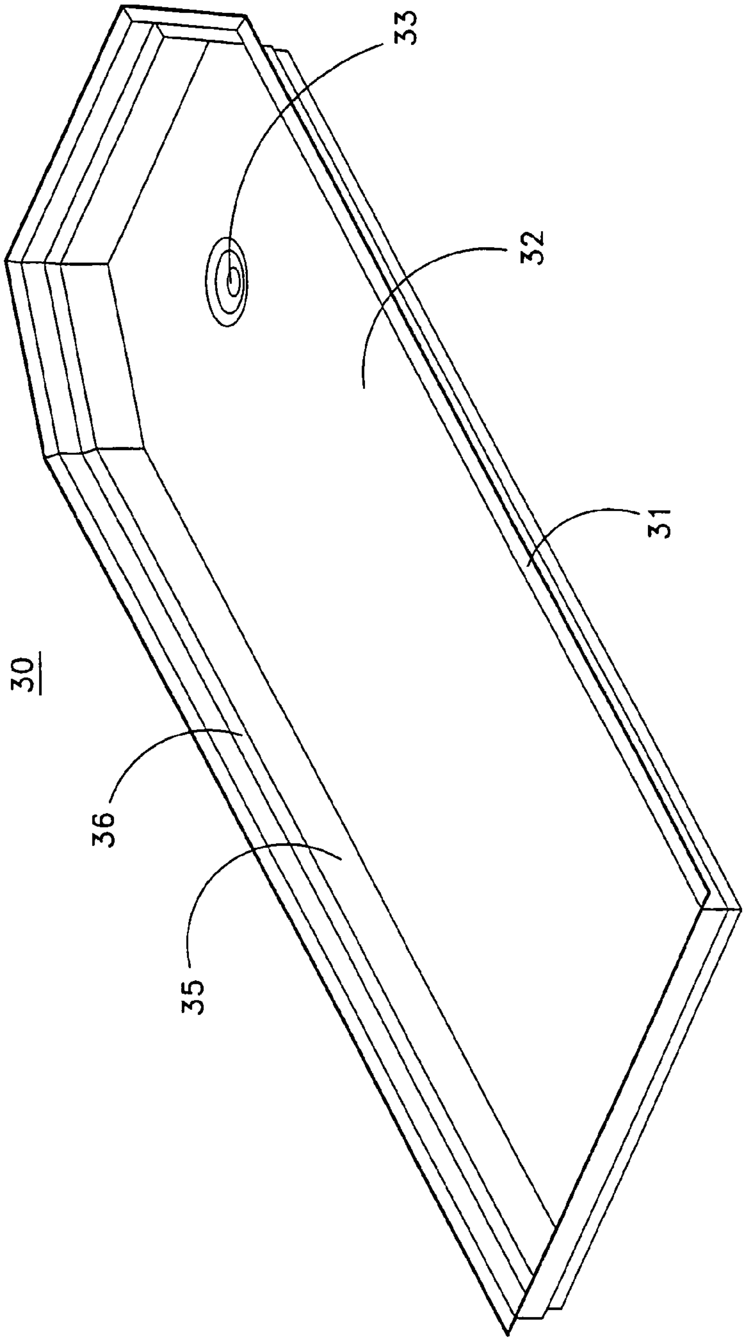

FIG. 5 provides an isometric view of an embodiment of a wet sink which can be inserted into the table frame of the table assembly.

Figure 6:
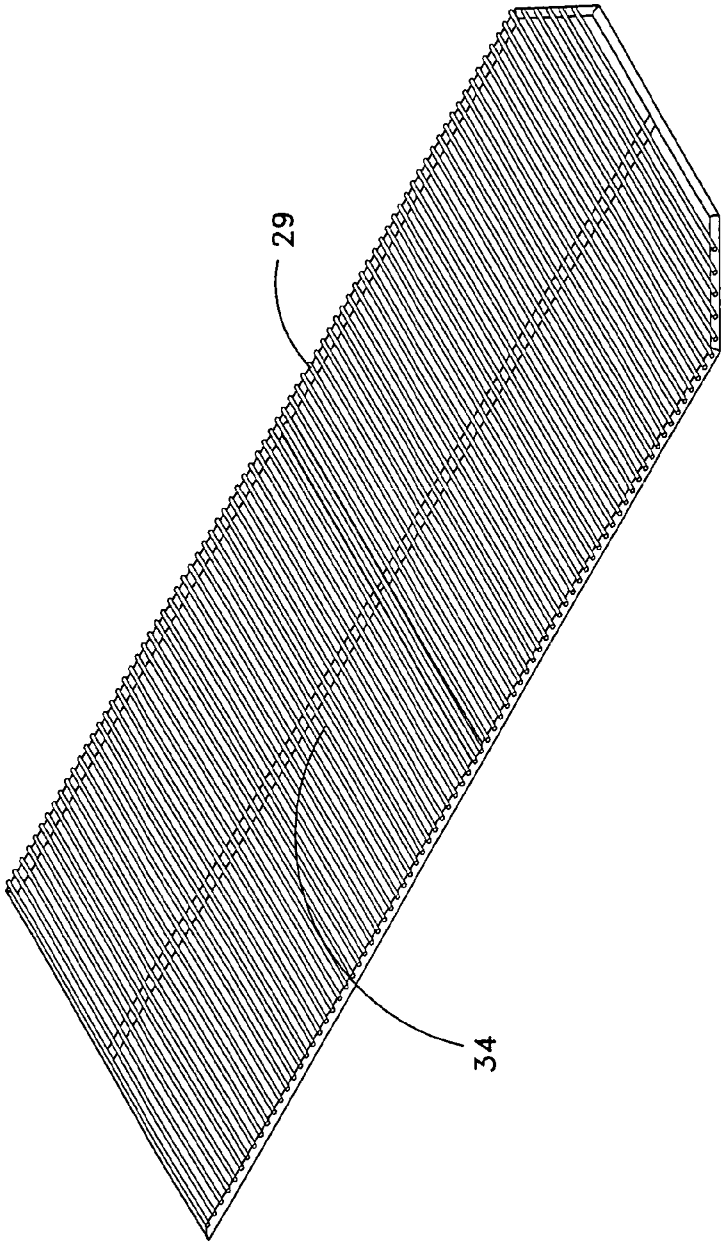

FIG. 6 provides an isometeric view of an embodiment of a table top having perforation elements to allow transfer of material from the table top surface to the wet sink.

Figure 7:
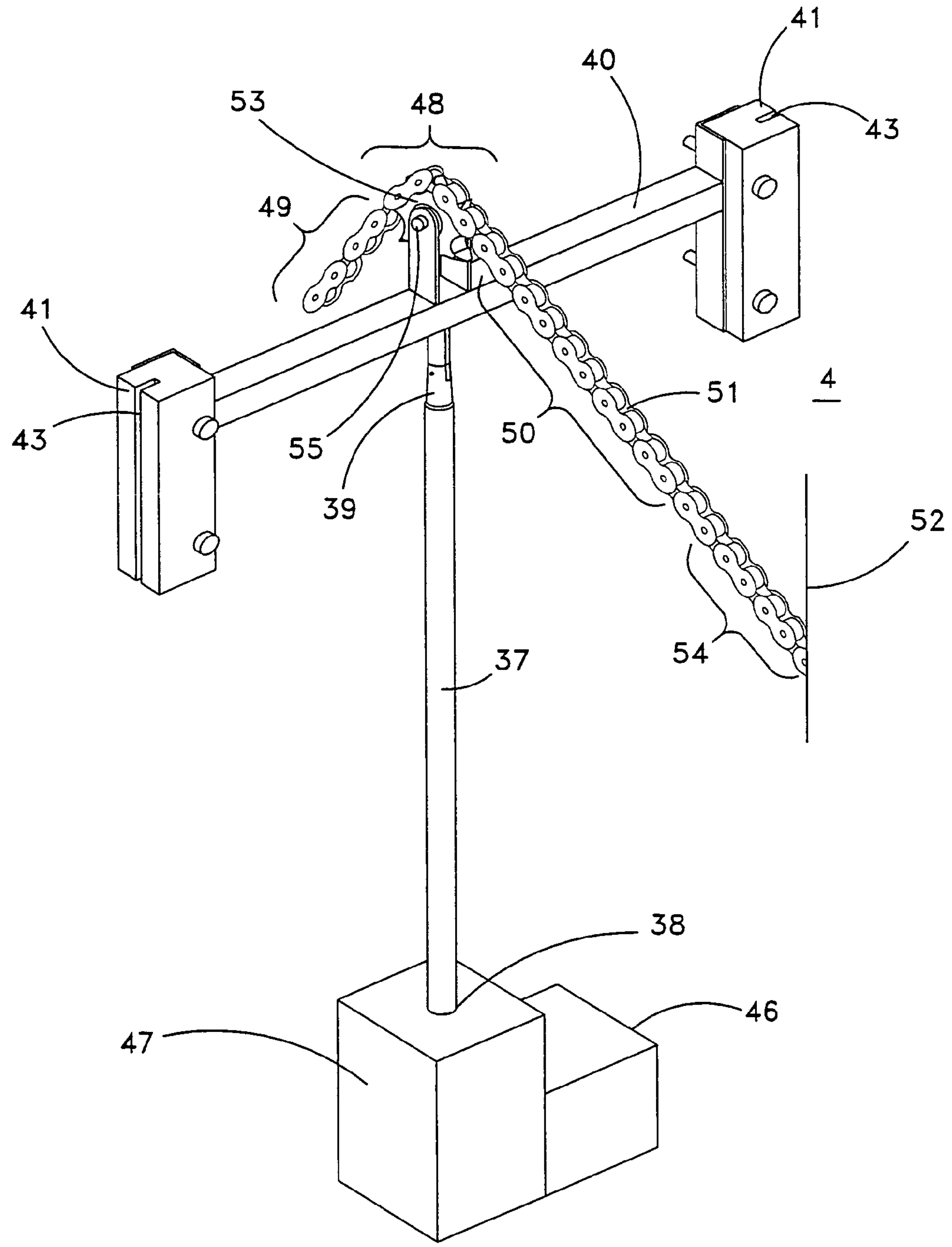

FIG. 7 provides an isometric view of an embodiment of the elevation assembly.

Figure 8:
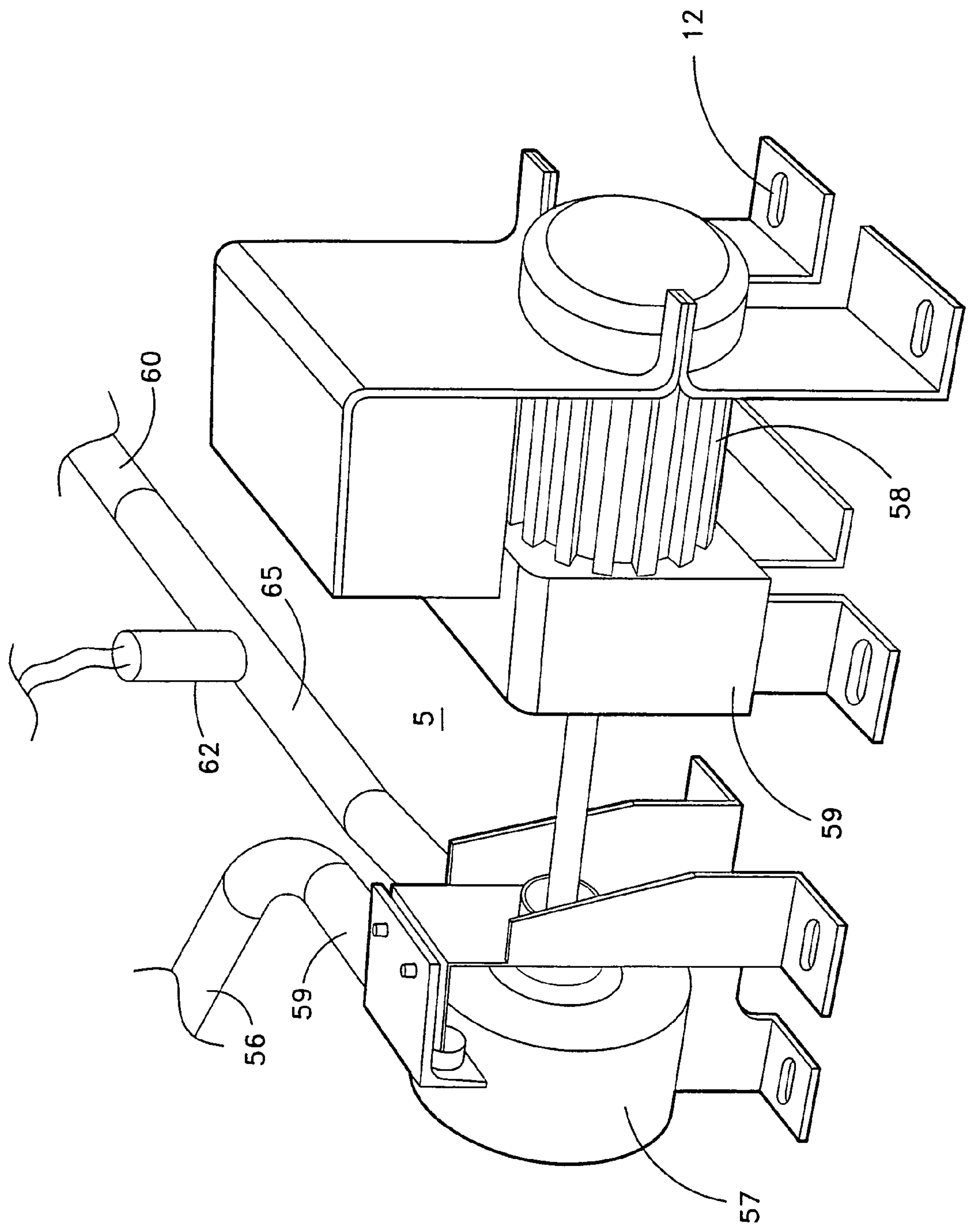

FIG. 8 provides an isometric of a portion of an embodiment of the material transfer assembly.

Figure 9:
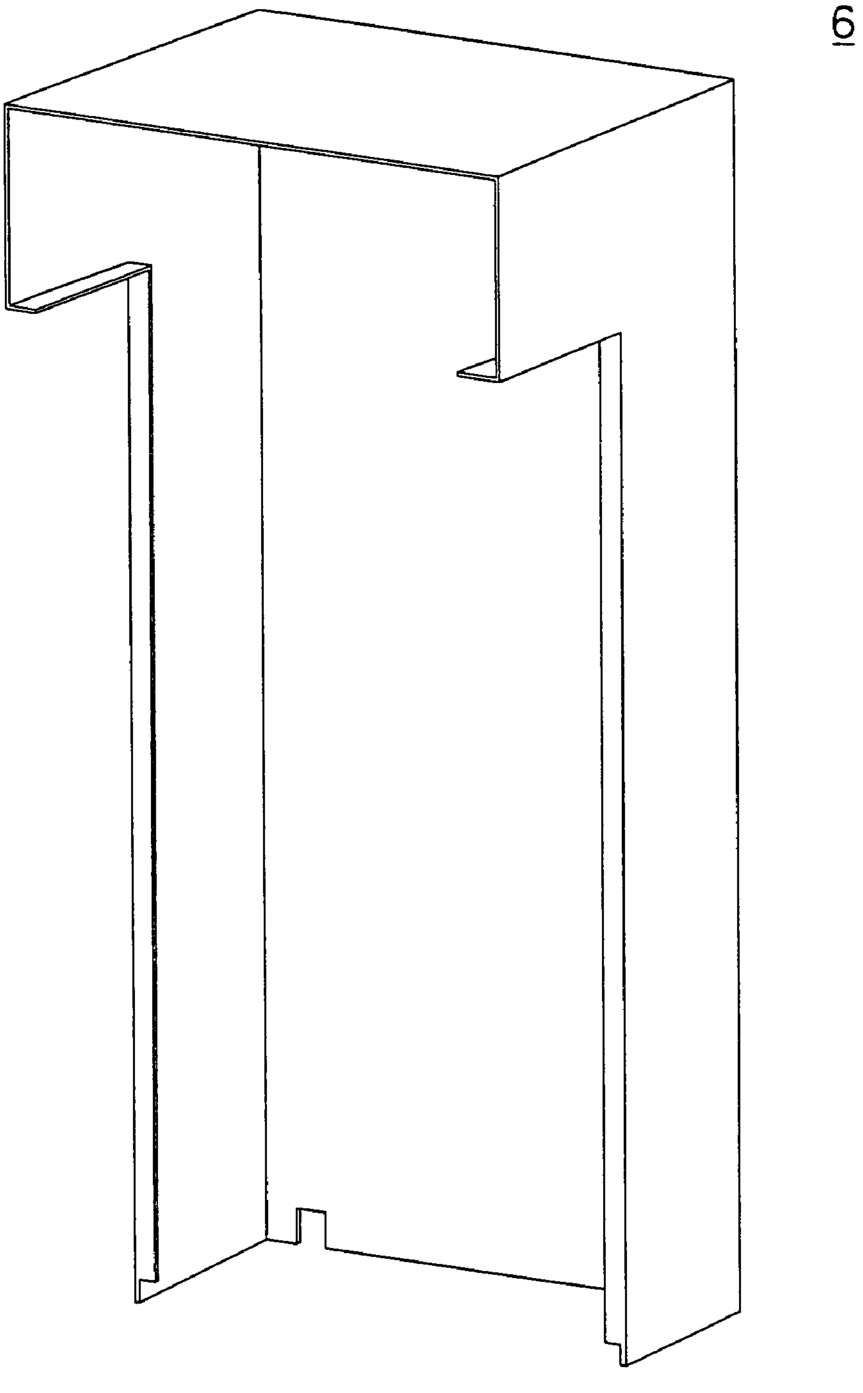

FIG. 9 provides an isometric view of the front cover of the veterinary table.

Figure 10:
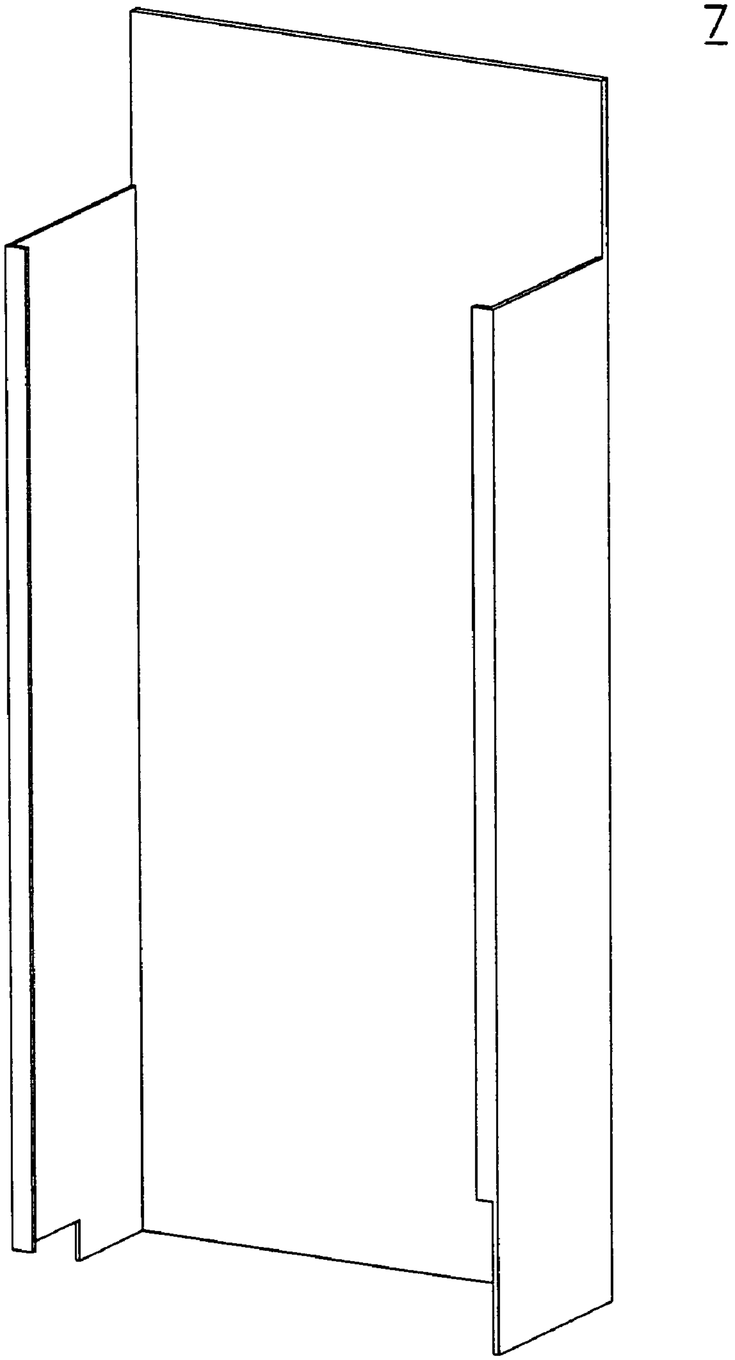

FIG. 10 provides an isometric view of the rear cover of the veterinary table.

IV. DETAILED DESCRIPTION OF THE PREFERRED EMBODIMENTS

First, referring primarily to FIG. 1, a preferred embodiment of the veterinary table having a wet sink can include five assemblies. A vertical frame assembly (1) which connects to a support assembly (2). A table assembly (3) slidly coupled with the vertical frame assembly (1). An elevation assembly (4) which operates to adjust the height of the table assembly (3). A material transfer assembly (5) which can conduct materials away from the table assembly (3). A front cover (6) and a rear cover (7)(not shown in FIG. 1) can positioned to cover certain components of the vertical frame assembly (3) and the material transfer assembly (5).

Now referring primarily to FIG. 2, a preferred embodiment of the support assembly (2) can include a base plate (8) and a horizontal support (9). The base plate (8) can configured to provide a mounting surface (10) for the vertical frame assembly (1), the elevation assembly (4), and certain components of the material transfer system (5). Threaded studs (11) can be attached to the base plate (8) to mate with bores (11) in the material transfer assembly (5) or the vertical frame assembly (3), or both, or the base plate (8) can be configured to accommodate other mechanical fasteners such as mated spirally threaded bolts and nuts or attachment of the vertical frame assembly (3) and the liquid transfer assembly by adhesives or welds. The base plate can further be configured to mate or connect to the front cover (6) or the rear cover (7). In the preferred embodiment of the height adjustable veterinary table, a portion of the base plate (8) can provide a plurality of projection elements (12) to which the front cover (6) and the rear cover attach.

Various configurations of the horizontal support (9) can extend from the base plate (8) a sufficient distance to maintain the table assembly (3) substantially parallel with the support surface (14). The direction and distance which the horizontal support (9) extends from the base plate (8) can be varied depending on the configuration of the table assembly (3) and the load which the table assembly (3) carries. As shown by FIG. 2, the horizontal support (9) can be constructed from two or more extension elements (15) with one or more cross members (16) connected to the extension elements (15). A horizontal support cover (17) can further be provided to cover the horizontal support (9), if desired.

In certain embodiments the veterinary table, the base plate (8) and the horizontal support (9) can be configured as a single integral construct whether from plate material or tubular material, or other configurations of material, to provide the mounting surface for vertical frame assembly (1) or other assemblies and to provide support to maintain the table assembly (3) substantially parallel to the support surface (14) when in use.

Now referring primarily to FIGS. 3 and 4, the vertical frame assembly (1) can include at least one vertical member (18) configured to slidly engage with a corresponding table guide (19) of the table assembly (3). The vertical members (18) could be of any desired cross section geometry including but not limited to a square, a rectangular, or other polygon, or a circle, oval, or other geometry containing both linear components and arc components which can be slidly engaged to a corresponding table guide (19) to allow the table assembly (3) to traverse a distance along the vertical members (18) while the table assembly (3) is held substantially parallel to the support surface (14).

A preferred non-limiting embodiment of the veterinary table provides a vertical member (18) configured from a pair of rectangular tubes (20) (21)(as shown by FIG. 3). A first surface (22) of a first rectangular tube (20) is disposed a distance from a first surface (23) of a second rectangular tube (21) to generate a track element (24) between the surfaces. Other configurations of the vertical member (18) can provide the track element (24) integral to a single piece of material, such as a U shaped channel.

A non-limiting example of the corresponding table guide (19) of the table assembly (3) is shown by FIG. 4. A pair of rollers (25) each rotate about an axle (13) the axes having a location on a guide support (15) such that the pair of rollers (25) can be inserted into and travel within the track element (24) of each corresponding vertical member (18) of the vertical frame assembly (1). At least one glide element (26)(such as, low friction slides such as Teflon.RTM) has a location on each table guide (19) to slidly engage a portion of the exterior surface of a corresponding verticle member (18) to maintain the table assembly (3) substantially parallel with the support surface (14) during use. Other configurations of table guides (19) can be used which mate with a portion of the exterior of the vertical members (18) to allow travel of the table assembly (3) within the distance between a first position and a second position.

Again referring primarily to FIG. 4, the veterinary table can further include a table (27) responsive to travel of the table guides (19). The table (27) can include a table frame (28) to which numerous and varied configurations of table tops (29) can be attached, coupled, or inserted, or the table can comprise a single integral piece connected to the table guides (19). The table (27) or table frame (28) can be made from a various materials such as metal, plastic so long as the table (28) has sufficient strength to support the desired loading capacity. The table can also be covered with varied types or kinds of upholstery, foam materials, or like, depending on the application.

Again referring to the non-limiting example provided by FIG. 4, with respect to certain embodiments of the veterinary table, the table guides (19) traverse the vertical members (18) such that the table (27) can be made responsive to travel of the table guides (19) (as shown by FIGS. 1 and 4) without perforating the front cover (6) or necessitating travel the front cover (6), in whole or in part, with travel of the table (27). As shown by FIG. 1, a coupler element (45) responsive to the elevation assembly (4) is configured to project outward beyond the exterior surface of the sides (63) of the front cover (6). The table (27) can be configured to attach to the coupler element (45) at the side of the veterinary table rather than at the front (64) of the veterinary table.

Now referring primarily to FIG. 5, a wet sink (30) can further be coupled to the table (27), whether integral to the table (27), or as a separate element which can be inserted and removed from the table frame (28). The wet sink (30) can be configured as necessary or desired to receive or contain an amount of material, such as water; urine; body fluids; cleaning, washing, disinfection, or treatment solutions; feces; hair; particulate; or the like.

A non-limiting example of a preferred embodiment of the wet sink (30) is shown by FIG. 5. The wet sink (30) inserts into the table frame (28) (shown by FIG. 4) and can be supported by engaging a flange (31) extending from the periphery of the wet sink (30)(although other attachment and support hardware can be used) with the table frame (28). The wet sink (30) typically provides a sink (32) having depth of between about one inch and three inches, however, the configuration of the sink (32) can vary depending on the application. The sink can be further configured to conduct material toward a drain (33) to transfer material away from the wet sink (30).

Now referring primarily to FIG. 6, a non-limiting preferred embodiment of a table top (29) for use with the wet sink (30) provides perforation elements (34) which allow material to be transferred from the surface of the table top (29) to the wet sink (30). The table top (29) having perforation elements (34) can be made from a variety of materials such as perforated metal or plastic sheet; wire or rod (as shown in FIG. 6) assembled to provide slots, a grid, or the like; or flexible net or mesh, as necessary or desired for an application. The table top (29) having perforation elements (34) can be further configured to be inserted and removed from the wet sink (30). With respect to the specific embodiment of table top (29) having perforation elements (34), the perforated table top can be supported by configuring the sink walls (35) to provide a step element (36) with which the table top (29) having perforation elements (34) engages.

Now referring primarily to FIG. 7, the table (27) can be made responsive to the elevation assembly (4) to provide variable height adjustment of the table (27) (whether utilized as a dry table or a wet table) relative to the support surface (14). As to certain embodiments of the veterinary table, an elevator element (37) can be selected from a group of devices having a first stationary end (38) and a second end (39)) which can be variably located within the range of travel between a first position and a second position, such as a pneumatic or hydraulic cylinders, or the like. The second end (37) can be connected to the table (27) at a coupler element (45) such that travel of the second end between the first position and the second position correspondingly raises or lowers the table (27). As to other embodiments of the elevation assembly (4), an electric screw can be rotated by a motor (46) (in some instances through a gear box (47)), or other drive means, to generate travel of a coupler element (45) having a spirally mated thread. Alternately, the table (27) can be coupled to other types of mechanical devices such as scissor or telescoping jacks, winch, or other devices, whether manual or electric, which can be coupled to the table (27) to generate travel for height adjustment.

The elevation assembly can further include a tackle assembly (48) which alters the transmission of force from the elevator element (37) to the table assembly (3) to gain an advantage in raising or lowering the table (27). The advantage gained can provide for a reduced power elevator element (37), or a reduced or increased speed at which the table (27) travels, or altered travel characteristics of the table (27) such as reduced vibration, consistency in rate of travel, or the like. The tackle assembly (48) can comprise a flexible material (51) having a first portion, part, or end (49) coupled to the table assembly (3) and a second portion or part (50) responsive to force transmission alteration element (53) and a third portion, part, or end (54) coupled to the elevator element (37), or coupled to a stationary element (52).

The flexible material (51) can comprise various flexible materials such as a cord or rope (carbon fiber, plastic, metal, braided, or the like); a belt (metal, rubber, plastic, or composite) which can have a smooth surface or a toothed surface or other surface features to enhance grip; or a chain or chain link, or other flexible material responsive to a force transmission alteration element (53) such as various types or arrangements of pulleys, sheaves, sprockets, or the like.

An alternate embodiment of the elevation assembly (4) further includes a carriage (40) responsive to the elevator element (37). The carriage (40) can travel between the pair of vertical members (18), or other vertical elements, to reduce lateral force on the elevator element (37). The carriage (40) can have a pair of carriage guides (41) which slidly engage or are responsive to a corresponding pair of carriage tracks (42). The carriage tracks (42) can be separate from or coupled to the vertical members (18), as shown by FIG. 3. The non-limiting example shown by FIG. 7 provides carriage guides (41) each having a slot (43) which slidly engage a corresponding projection element (44) on each carriage track (42). Among other alternatives, the carriage guides (41) could also comprise a pair of rollers which rotate about an axle and the carriage track (42) could comprise a channel in which the wheels or rollers travel. As to embodiments of the elevation assembly (4) which utilize the carriage (40), the varied types of elevator elements (37) described above can be coupled to the carriage (40) to generate travel of the carriage (40) to raise and lower the table (27).

A preferred non-limiting embodiment of the veterinary table includes the elevation assembly (4) shown by FIG. 7. As shown, the elevator element (37) comprises a screw having reversible rotation (such as an electric linear actuator manufactured by Linak A/S, Guderup, Denmark, model LA34) driven by a motor (46) with a gear box (47) to extend or retract the second end (39). The second end (39) can be coupled to the carriage (40) which further includes an embodiment of the force transmission alteration element (53) (a toothed sprocket which rotates about an axle (55)). The toothed sprocket engages an embodiment of the flexible material (51) (a chain link which mates with the toothed sprocket). The first portion or end of the chain link (51) can be coupled to the table assembly (3) at coupler (45) while the third portion or end of the chain link (54) couples to a stationary element (52) such as base plate (8).

As the second end (39) of the elevator element (37) moves within the range of travel between a first position and a second position the carriage traverses a similar distance which allows the toothed sprocket to travel along the second portion of the chain link (50) which alters the length of the first portion of the chain link (49) resulting in travel of the table assembly (4).

Now referring primarily to FIGS. 1 and 6, the height adjustable wet table can further include a material transfer assembly (5) to conduct material from the wet sink (30) to an material outlet (56) (as shown in FIG. 1). The material outlet (56) can be coupled to a waste system (not shown) such as a drainage system in a residential or commercial building, septic system, or other waste containment system.

The material transfer assembly (5) can include a material flow generator (57) which establishes a flow of material between the drain (33) having a location in the wet sink (30) and the material outlet (56). A non-limiting example shown by FIG. 8, provides a material flow generator (57) comprising a peristaltic pump (such as, Little Giant Pump Company, model LG-300) driven by a motor (57) (which can further include a gearbox (58)) (such as, AC International, model 34R-W). The peristaltic pump (57) acts upon a peristalsis conduit (59) (such as, McMaster-Car, item 5229K42) to establish a flow of material in the peristalsis conduit (59). The peristalsis conduit (59) can be connected to a flexible conduit (60) which couples to the drain (33) having a location in the wet sink (30). Material entering the flexible conduit can be conducted to the peristalsis conduit (59) and transferred to the material outlet by action of the peristaltic pump (57).

Certain embodiments of the material transfer assembly (5) can further include a trap (61) (such as, a no clog T-trap, T. F. Marchionda Corporation, P.O. Box 322 Youngstown, Ohio 44501) between the drain (33) and the flexible conduit (60) to remove certain types or kinds of material received from the drain (33).

Other embodiments of the material transfer assembly (5) can further include a material sensor (62) located between the drain and the pump. Upon sensing material within the conduit between the drain (33) and the material flow generator (57), the material sensor (62) generates a signal to activate the material flow generator (57) to establish a flow of the material from the wet sink (30) to the material outlet (56). As a non-limiting example, the material sensor (62) can be an ultrasonic point level switch (such as an Omega LVU-700 series liquid level detection system) which operates using ultrasonic waves. The ultrasonic sensor (62) can be installed in rigid conduit (65) immediately prior to the material flow generator (57).

The veterinary table can further include a liquid dispersal element (66) connected to a hot or a cold liquid transfer conduit or both (67) with bibs located on the exterior of the veterinary table (for example, the conduits can be steel braided conduit with a ⅜ inch bib). Liquid from a liquid source can be delivered the liquid dispersal element through a mixing valve and dispersed as a flow of liquid, a stream of liquid, or a spray, or the like.

The veterinary table can further provide a power source (68) and control unit (69) along with the necessary electrical circuitry, hydraulic flow paths, or pneumatic flow paths to power and control the various components of the elevation assembly (4) and the material transfer assembly (5) in response to signals generated by utilization of manually controlled actuators or switches (levers (70), foot pedals (71), foot switches (71), main power on-off switches (72), subassembly on-off switches, or the like) or signals generated automatically in response to operation of the invention itself, such as: sensing material in the conduit between the drain (33) and the material flow generator (57), sensing the position of the table assembly, sensing rate of travel of the table assembly, sensing an object or surface in contact with the table assembly, or the like.

With respect to certain embodiments of the invention, the power source (68) can be 110 volt alternating current (although the invention can be configured for other voltage and current specifications). Some embodiments of the invention can provide a battery (73), and further include a battery recharger (74), and the various electrical circuits, transformers controls, and relays, to utilize the battery and battery recharger. The battery (73) and battery re-charger (74) can have a location within the enclosed volume defined by the front cover (6) and the rear cover (7).

Now referring primarily to FIGS. 9 and 10, a front cover (6) and a rear cover (7) can be configured (for example, as shown by FIG. 1) to substantially enclose the elevation assembly (1), the material transfer assembly (5) and the guide elements (19) of the table assembly (3). The front cover (6) and the rear cover (7) can have attachments to the vertical frame assembly (1), or to the base plate (8) or have attachments to each other.

A further feature of an embodiment of the veterinary table can be rotatable elements (66) such as wheels, casters, and rollers. The rotatable elements (66) may also be swiveled in order to further allow more precise articulation of the position of the table assembly (3). These rotatable elements may also include a braking assembly.

A typical method of using the present invention may include the following steps. An animal may be located in proximity of the table assembly (3). The operator can lower the table assembly (3) to a minimum elevation from the supporting surface (14). The animal can be transferred to the table top (29) having perforation elements (34), if material is to be transferred to the wet sink (30). The table may be raised to a suitable elevation for performing the procedures desired. Material from the animal or liquid dispersed from the liquid dispersal element (66) can be transferred to the wet sink (30). The material flow generator (57) (activated manually or by a signal from the material sensor (62) can conduct the material and liquid to the material outlet (56). Upon completing the procedures, the table assembly (3) may be lowered to a suitable elevation, the animal transferred from the surface of the table top (29) and allowed to recover from the procedure and perhaps sedation.

As can be easily understood from the foregoing, the basic concepts of the present invention may be embodied in a variety of ways. The invention involves numerous and varied embodiments of a veterinary table and methods of making and using such veterinary table whether configured as a dry table or wet table.

As such, the particular embodiments or elements of the invention disclosed by the description or shown in the figures accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "elevator" should be understood to encompass disclosure of the act of "elevating"—whether explicitly discussed or not—and, conversely, were there effectively disclosure of the act of "elevating", such a disclosure should be understood to encompass disclosure of a "elevator" and even a "means for elevating." Such alternative terms for each element or step are to be understood to be explicitly included in the description.

In addition, as to each term used it should be understood that unless its utilization in this application is inconsistent with such interpretation, common dictionary definitions should be understood to included in the description for each term as contained in the Random House Webster's Unabridged Dictionary, second edition, each definition hereby incorporated by reference.

Thus, the applicant(s) should be understood to claim at least: i) each of the veterinary tables herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The claims set forth in this specification are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

The claims set forth below are intended describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

I claim:

1. A veterinary table, comprising:

a. a support assembly which engages a support surface;

b. a vertical frame assembly connected to said support assembly;

c. a table assembly having a wet table, wherein said table assembly height adjustably couples to said vertical frame assembly;

d. an elevation assembly coupled to said table assembly which operates to adjust height of said table assembly having said wet sink relative to said support surface;

e. a flexible conduit connected between a drain of said wet sink and a receiving drain, wherein said flexible conduit has sufficient flexure to allow operation of said elevation assembly to adjust height of said table assembly;

f. a material flow generator which operates to transfer material within said flexible conduit to said receiving drain; and g. a material sensor located on the input side of said material flow generator which activates said material flow generator in response to material within said flexible conduit.

2. A veterinary table as described in claim 1, wherein said material flow generator comprises a peristaltic pump which acts upon a portion of said flexible conduit to generate flow of said material within said flexible conduit.

3. A veterinary table as described in claim 2, wherein said portion of said flexible conduit acted upon by said peristaltic pump has a Shore A of between about 45 and about 55.

4. A veterinary table as described in claim 3, wherein said portion of said flexible conduit acted upon by said peristaltic pump has a tensile strength of between about 1300 pounds per square inch and about 1500 pounds per square inch.

5. A veterinary table as described in claim 4, wherein said portion of said flexible conduit acted upon by said peristaltic pump has an elongation of between about 300 percent and 500 percent.

6. A veterinary table as described in claim 1, wherein said material sensor comprises an ultrasonic sensor.

7. A method of making a veterinary table, comprising:

providing a support assembly;

coupling a vertical frame assembly to the support assembly;

slidably coupling a table assembly having a wet sink to the vertical frame assembly, the wet sink including a drain for transferring material from the wet sink to a material outlet;

providing an elevation assembly to adjust a height of the table assembly;

coupling a motor to the elevation assembly for moving the table assembly to a desired height;

coupling a first end of a flexible conduit to the drain;

coupling a second end of the flexible conduit to the material outlet; and coupling a material flow generator to the flexible conduit.

8. A method of making a veterinary table as described in claim 7, further comprising coupling the material flow generator to the flexible conduit to generate peristalsis in a portion of the flexible conduit to establish flow of the material in the flexible conduit.

9. A veterinary table in accordance with the process of claim 7.

10. A method of making a veterinary table, comprising:

providing a support assembly;

coupling a vertical frame assembly to the support assembly;

slidably coupling a table assembly having a wet sink to the vertical frame assembly, the wet sink including a drain for transferring material from the wet sink to a material outlet;

providing an elevation assembly to adjust a height of the table assembly;

coupling a motor to the elevation assembly for moving the table assembly to a desired height;

coupling a flexible conduit between the drain and the material outlet;

coupling a material flow generator to the flexible conduit to generate peristalsis in a portion of the flexible conduit to establish flow of the material in the flexible conduit; and positioning a material sensor at a location to sense material in the flexible conduit.

11. A method of making a veterinary table as described in claim 10, wherein the material sensor comprises an ultrasonic sensor.

* * * * *

UNITED STATES PATENT AND TRADEMARK OFFICE

CERTIFICATE OF CORRECTION

PATENT NO. : 7,428,882 B2

APPLICATION NO. : 11/431744
DATED : September 30, 2008
INVENTOR(S) : Charles C. Keil It is certified that error appears in the above-identified patent and that said Letters Patent is hereby corrected as shown below:

Column 1
Lines 30-31, reads “rinsing of the animals mouth” and should read -- rinsing of the animal’s mouth --.
Lines 31-32, reads “tables may not equipped to dispose of” and should read -- tables may not be equipped to dispose of --.

Column 2
Line 41, reads “provides an isometric of a portion” and should read -- provides an isometric view of a portion --.
Line 54, reads “assembly (3) slidly coupled with the” and should read -- assembly (3) slidably coupled with the --.
Line 59, reads “can positioned to cover” and should read -- can be positioned to cover --.
Line 64, reads “can configured to provide” and should read -- can be configured to provide --.

Column 3
Line 5, reads “threaded bolts and nuts or attachment of” and should read -- threaded bolts and nuts for attachment of --.
Line 35, reads “configured to slidly engage with” and should read -- configured to slidably engage with --.
Line 40, reads “which can be slidly engaged to” and should read -- which can be slidably engaged to --.
Line 62, reads “such as, low friction slides” and should read -- such as low friction slides --.
Line 63, reads “to slidly engage a portion of” and should read -- to slidably engage a portion of --.

Column 4
Line 10, reads “can be made from a various” and should read -- can be made from various --.
Line 11, reads “such as metal, plastic so long as” and should read -- such as metal or plastic so long as --.
Lines 21-22, reads “or necessitating travel the front cover” and should read -- or necessitating travel by the front cover --.

UNITED STATES PATENT AND TRADEMARK OFFICE

CERTIFICATE OF CORRECTION

PATENT NO. : 7,428,882 B2
APPLICATION NO. : 11/431744
DATED : September 30, 2008
INVENTOR(S) : Charles C. Keil It is certified that error appears in the above-identified patent and that said Letters Patent is hereby corrected as shown below:

Column 5

Line 4, reads “and a second end (39)) which can” and should read -- and a second end (39) which can --.
Line 47, reads “which slidly engage or” and should read -- which slidably engage or --.
Line 52, reads “which slidly engage a” and should read -- which slidably engage a --.

Column 6

Line 42, reads “P.O. Box 322 Youngstown, Ohio” and should read -- P.O. Box 322, Youngstown, Ohio --.
Line 65, reads “can be delivered the liquid dispersal element” and should read -- can be delivered to the liquid dispersal element --.

Column 8

Line 27, reads “should be understood to included in the” and should read -- should be understood as included in the --.

Column 9

Line 1, reads “are intended describe the” and should read -- are intended to describe the --.

Signed and Sealed this

Tenth Day of November, 2009

David J. Kappos
*Director of the United States Patent and Trademark Office*